(12) United States Patent
Lovell

(10) Patent No.: US 12,495,821 B1
(45) Date of Patent: Dec. 16, 2025

(54) PROCESS FOR MASKING THE FLAVOR OF SEEDS

(71) Applicant: William Paul Lovell, Manitowoc, WI (US)

(72) Inventor: William Paul Lovell, Manitowoc, WI (US)

( * ) Notice: Subject to any disclaimer, the term of this patent is extended or adjusted under 35 U.S.C. 154(b) by 0 days.

(21) Appl. No.: 18/640,199

(22) Filed: Apr. 19, 2024

Related U.S. Application Data

(60) Provisional application No. 63/468,636, filed on May 24, 2023.

(51) Int. Cl.
*A23L 27/00* (2016.01)
*A23L 27/10* (2016.01)
*A23L 27/30* (2016.01)

(52) U.S. Cl.
CPC ............... *A23L 27/84* (2016.08); *A23L 27/10* (2016.08); *A23L 27/30* (2016.08)

(58) Field of Classification Search
CPC ........... A23L 27/30; A23L 27/10; A23L 27/84
See application file for complete search history.

(56) References Cited

U.S. PATENT DOCUMENTS

| | | | | |
|---|---|---|---|---|
| 5,194,278 A | * | 3/1993 | Strong | A23P 20/10 426/632 |
| 2015/0321208 A1 | * | 11/2015 | Kramedjian | A23L 27/30 426/302 |

FOREIGN PATENT DOCUMENTS

| CN | 112450407 A | * | 3/2021 | ............... A23B 9/26 |

OTHER PUBLICATIONS

Machine translation of CN112450407, publication date Mar. 9, 2021. pp. 1-10. (Year: 2021).*

* cited by examiner

*Primary Examiner* — Jenna A Watts
(74) *Attorney, Agent, or Firm* — CERES Patent & Technology, LLC; Mandy L. Tran, Esq.

(57) ABSTRACT

The invention herein provides for an approach whereby a water-soluble high-intensity sweetener is used in place of sucrose or sugar as a formulation that produces highly flavored and palatable seeds and pulses within a shorter time frame and in lower temperature conditions. The resulting product of this invention comprises a sweet-cured pulse having a hydrated or semi-hydrated tender and firm internal texture in a low-moisture internally hydrated state.

4 Claims, 2 Drawing Sheets

Figure 1:
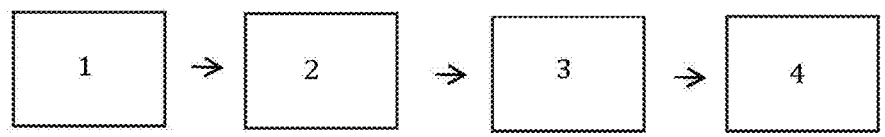

1. Prepare high-intensity sweetener-based aqueous infusion solution

2. Hydrating and infusing dry seeds

3. Removing hydrated and infused seeds

4. Drying removed hydrated and infused seeds

1. Prepare high-intensity sweetener-based aqueous infusion solution
2. Hydrating and infusing dry seeds
3. Removing hydrated and infused seeds
4. Drying removed hydrated and infused seeds

PROCESS FOR MASKING THE FLAVOR OF SEEDS

CROSS REFERENCE TO RELATED APPLICATIONS

This nonprovisional utility patent application incorporates by reference in its entirety and claims benefit to provisional patent application No. 63/468,636, having the filing date of May 24, 2023, pursuant to 35 U.S.C. § 119 (e).

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

FIELD OF THE INVENTION

This application is directed to a process that masks the flavor and improves upon texture of dry seeds by utilizing a high-intensity sweetener-based aqueous infusion solution.

BACKGROUND OF THE INVENTION

A pulse is the edible seed of plants within the legume family. The term "pulse" refers only to the dry edible seed within the pod. Beans, lentils, chickpeas, and split peas are among the most commonly consumed type of pulse in Western cultural cuisine.

Pulses are prepared and featured in different ways among various cultures. Typically, they are presented as savory food either as a portable snack or a meal. The preference for the particular type of pulse to be featured as a snack or meal item is often influenced by cultural techniques and traditions. A wider variety of legume plants are used in Eastern culture in their cultural cuisines and thus, it is unsurprising that a wider variety of pulses is prepared as transportable snacks in those regions. Pulse-based snacks in Western culture are more commonly limited to nuts with fewer bean options where the whole pulse is used. Whole-pulse snacks are commonly presented in dry form, either as a raw or roasted product. They are not presented in soft form unless within a shell because the physical and molecular nature of its flesh will disintegrate in solution.

The challenge exists in the desire to introduce new types of whole-pulse snacks with new textures and flavor profiles to any culture of cuisine. The cause for this challenge has much to do with the physical composition of the seed body of the pulse. The seed body is unable to hold its shape upon extensive absorption of moisture. This creates limitations on how it is manufactured. For this reason, whole-pulse snacks globally are presented in dry form with externally coated seasoning. Some manufacturing processes will submerge the pulse in brine solution for short duration to improve taste by introduction of salt. This method provides commercial advantage where the final seed product may be packaged without an additional coating of seasoning yet will have a better flavor than an unseasoned raw seed. The consumer will experience a salted product without the mess of handling an external coating of salt. However, the method of brining will not result in a deeply or evenly penetrated seasoning into the seed body. As such, the natural flavor of the pulse will remain present and noticeable, neither lost nor masked by the effect of brining. Other flavors that may be infused into the seed through brining must still complement the salted flavor of brine and the natural flavor of the pulse. Given the inherent limitations of the seed flesh and existing methods of preparation, whole-pulse snacks remain savory, hard, and dry.

Various methods have been devised to improve upon the manufacture of whole-pulse snacks to improve on flavor, texture, and portability. For example, U.S. Pat. No. 8,771,769 provides a method for roasting and infusing seeds with flavors, textures, densities, and other functionalities. However, this patent uses salt brine to soften the bean and includes natural sugar for flavoring. The brine solution is 20% salt concentration with sugar as a form of flavoring. The salty brine solution serves to soften the bean initially in order to allow for infusion of flavor into the seed flesh. It is not a desirable outcome in this case to produce an overly salted or degraded seed product. Thus, the brine solution is not overly saturated with salt and the submersion time is limited to keep the integrity of its shape for roasting. The hydration of seeds and pulses in a solution containing flavors and natural sugars (i.e. sucrose or sugar) is well-known. However, the end result of this type of hydration results in an inferior-tasting seed and a somewhat bland or beany-tasting pulse.

The following patents, U.S. Pat. Nos. 5,194,278A, 4,206,246A, CN108771183A, and CN111011798A, have attempted to steer pulse snack flavors toward a sweeter profile. In these instances, sweetness is enhanced by coating the seeds with natural sugar ingredients and then drying the final cooked product either by method of frying or roasting. In these instances, the natural flavor of the pulse is prevalent and thus, the sweet-inspired flavors must still complement the natural inherent flavor of the pulse. The sweet-inspired flavors are still limited to popular flavors that complement its inherent savory flavor (i.e. lemon, and natural sugar or honey). The final texture for these methods is also still hard and dry.

It is worth noting that the brining methods introduced by the above-cited prior art are not meant to cure the seeds, which would have a negative effect of over-salting and dehydrating the seed product. Curing seeds by manner of a supersaturated brine solution is not a feasible method of preparation because the density of the seed would be too light and fail to submerge in the supersaturated brine solution. Therefore, curing beans by manner of brining is not a practical method for large-scale manufacturing and has not been considered a method for preparing whole-pulse snack products.

Given the primary desire to keep the final shape and integrity of the cooked nuts in whole form for portability purposes, standard methods of manufacturing pulse will typically end with frying or roasting to encapsulate flavor while drying the nut. The final cooked snack product typically is dry and hard or crispy in texture.

None of the prior art listed above teaches a process that produces highly palatable seeds or pulses that occupy a non-savory sweet-based flavor profile, where the natural flavors of the legume pulse are masked, the integrity of each seed is maintained whole, and is hydrated in texture but not wet. There remains a need for a method by which legume seeds may be processed and adopted as a portable snack having a sweet-based profile with a tender texture wherein the method of manufacturing will not result in excessive hydration of the pulse that would otherwise lead to unwanted waste.

SUMMARY OF THE INVENTION

The invention herein provides for an approach whereby a water-soluble high-intensity sweetener is used in place of sucrose or sugar as a formulation that produces highly flavored and palatable seeds and pulses within a shorter time frame and in lower temperature conditions. The resulting product of this invention comprises a sweet-cured pulse having a hydrated or semi-hydrated tender and firm internal texture in a low-moisture internally hydrated state. Low-moisture in this case refers to the external surface of the hydrated or semi-hydrated seed as not being wet or sticky to the touch. Internal texture in this case refers to the flesh of the seed internal to and including its exterior surface. Said sweet-cured pulse having a sweet base flavor that masks the savory, bland, or beany flavor of the pulse.

The sweet base flavor provides a base flavor palate that complements any variety of non-savory types of sweet-flavored foods and aromas such as fruit, floral, vegetative, herbaceous, artificial, acidic, and other non-savory flavors. Said sweet base flavor may also complement savory flavors as well as many savory flavors that include a sweet counterbalancing component. The sweet base flavor of this sweet-cured pulse does not form the main flavor profile of the pulse product but serves to mask the natural flavor of the pulse and create a base flavor that is complementary to non-savory flavors. By this method, a pulse may carry another dominant flavor other than its own natural flavor, where its own natural flavor becomes nearly or completely imperceptible.

By subjecting the seed to a shorter period of hydration at a lower temperature range within a predetermined concentration of high-intensity sweetener infusion solution (which may also contain additional complementary flavors and ingredients), the texture of the seed body remains whole, dense, and firm in its integrity while acquiring a semi-hydrated tender and chewy-like texture. That is, the flavor of the seed body may achieve a strong masking flavor while maintaining its physical integrity and achieving a semi-hydrated tender feel. This has not been previously achievable because the level of flavor concentration (utilizing either salt or sugar) would have needed to be too high to achieve such flavor levels. In this state, the concentration of the flavor ingredient (i.e. sugar or salt) would have caused the seeds to buoy in the super-concentrated solution. By current methods, it would take longer and higher heat levels for infusion to reach the level of flavor achieved by this method, resulting in the disintegration of the seed flesh. This method produces a product with an improved texture and structure that can hold its shape in semi-hydrated form in a transportable fashion. The resulting texture of the product serves as a new type of texture and flavor vehicle for a semi-hydrated transportable pulse-based snack. The final pulse product may no longer need to be solely hydrated-and-soft or dry-and-hard but may now also maintain a mid-level semi-hydrated soft texture and mouthy consistency similar to chewy candy.

By the method of this invention, a transportable whole-seed snack may take on a new texture and a completely different flavor that is foreign to its natural flavor. Foreign in this regard means any flavor or flavor profile that can be considered and achieved beyond the paradigm limitations of the natural flavor of the seed or those flavor or flavor profiles that would be complementary to that natural flavor. The paradigm limitations of the natural flavor of the seed refer to flavor profiles that are deemed complementary to the natural flavor of the snack and palatable by consumers. This inventive method allows the seed to be converted to a wider spectrum of potential flavors (i.e. non-savory flavored snack) with a tender, dense, and firm texture much like a jelly or chewy candy food item. Tender in this case refers to having a non-crunchy or a non-hard texture. The texture of the pulse is changed by the high-intensity sweetener solution resulting in a chewy, firm, and dense texture that is not loose nor grainy.

The final semi-hydrated product that is produced by this method may further be taken through an additional process of dehydration (by means of frying, roasting, or air drying) to produce a flavorful hard and crunchy end product.

A pulse, as used herein, refers to any dried edible seed of a leguminous plant. Pulses are typically high in protein, high in fiber, and very low in fat and are often stored in a dried state. Examples of pulses include but are not limited to, kidney beans, navy beans, pinto beans, soybeans, lima beans, azuki beans, mung beans, mungo beans, scarlet runner beans, rice beans, moth beans, tepary beans, horse beans, broad beans, field beans, black beans, yellow whole peas, garden peas, chickpeas, cowpeas, pigeon peas, lentils, earth peas, vetches, lupins, hyacinth beans, jack beans, winged beans, velvet beans, yam beans, and combinations thereof.

A seed, as used herein, is by its general definition and includes any variety of edible nuts, kernels, beans, and the like. Examples of edible nut and nut-type seeds include pistachios, cashews, hazelnuts, filberts, macadamia nuts, brazil nuts, pine nuts, pecans, and walnuts. Peanuts and almonds are technically legumes but are commercially cross-categorized as a nut or nut-type food. Reference to a seed, nut, or pulse may include peanuts and almonds and other similar types of cross-categorical seed-based food.

Although the method of this invention primarily describes application on pulses and hard, raw, or roasted seeds, it will be appreciated that soybeans, lentils and other such non-pulse legumes may be employed.

Natural sweeteners in this case refer to sweeteners produced biologically by plants and animals in and of this world. They are obtained for consumption by means of extraction or reduction from their originating source but without chemical alteration of their inherent compound make-up. Examples of natural sweeteners for common general consumption comprise but are not limited to sucrose, sugar, maple syrup, honey, agave syrup, fructose, glucose, etc.

High-intensity artificial sweeteners are sweeteners that are non-naturally occurring and are originally formulated and chemically manufactured by human beings. What makes them highly intense as a sweetener is that they are typically several hundred times sweeter than sweeteners that are commonly used for general consumption such as sucrose, sugar, honey, and plant syrups. Examples of high-intensity artificial sweeteners include but are not limited to: saccharin, aspartame, acesulfame potassium (Ace-K), sucralose, neotame, and advantame. These identified examples are currently approved for commercial and general use and consumption by the U.S. Food and Drug Administration (FDA), but there are additional types of high-intensity artificial sweeteners that exist or are accessible internationally.

High-intensity sweeteners more generally refer to sweeteners (whether naturally occurring or artificially made) that are sweeter than natural sweeteners used for general consumption such as sucrose, sugar, honey, and plant syrups. For example, Stevia is an extracted natural sugar from the Stevia rebaudiana plant that is 200-400 times sweeter than sucrose. The more common types of high-intensity sweeteners are artificial in nature with more recent discoveries of natural options such as Stevia.

The invention herein provides for exemplary embodiments that are directed towards creating seeds and pulses infused with a high-intensity sweetener that is at least 39 times sweeter than natural sweeteners (i.e. sugar/sucrose and other types for general consumption) and, thereby, having a curing effect on a food product, specifically here seed, nut, pulse food products. An immersion solution utilizing high-intensity sweetener achieves a sweetness that is at least 39 times sweeter than a solution of similar density utilizing common household natural sweetener (i.e. sugar, sucrose, honey). The greater level of sweetness achieved by dissolved high-intensity sweetener enables a faster rate of flavor infusion into the pulse flesh in comparison to a less intensely sweet natural sugar-based solution of the same or similar solvent concentration.

By this inventive method, the end flavor of the pulse flesh is intensely sweet enough to mask the natural flavor of the pulse while having an altering effect on texture. In addition, the high infusion rate of the high-intensity artificial sweeter serves as an effective vehicle to draw in with it other flavors in solution such that the final flavor of the infused pulse flesh is strong, bold, non-ambiguous and well-defined. As such, the flavoring method of this invention has the dual effect of masking the natural flavor of the seed and replacing that natural flavor with a foreign flavor. Unlike previous art in this realm where the natural flavor is enhanced by subtle layers of additional flavors, the invention herein replaces the natural flavor with a foreign flavor by method of masking. The final texture of the infused pulse may either be maintained in partially hydrated or cured form or alternatively, in a harder dehydrated form by drying, frying, or roasting.

Among the advantages of this invention is a resulting broader flavored product having a wider variety of texture options (tender, crispy, or crunchy) that is produced from inexpensive ingredients, without expensive equipment, without extensive cooking times, and without significantly compromising the nutritional qualities of the raw or roasted seed or pulse.

It would be desirable to provide a highly palatable food product without the external gooey or sticky coating that is healthy, tastes good, is shelf stable, and is easily and inexpensively produced.

In order to facilitate an understanding of this invention, the preferred embodiments of the invention are illustrated in the drawings, and a detailed description thereof follows. Other features, advantages, and object of the present invention will become more apparent and be more readily understood from the following detailed description, which should be read in conjunction with the accompanying drawings. It is not intended, however, that the invention be limited to the particular embodiments described or illustrated herein. Various modifications and alternative embodiments such as would ordinarily occur to one skilled in the art to which the invention relates are also contemplated and included within the scope of the invention described and claimed herein.

BRIEF DESCRIPTION OF THE ILLUSTRATIONS

FIG. 1 is an exemplary embodiment of a method to flavor seeds according to this invention.

Figure 2:
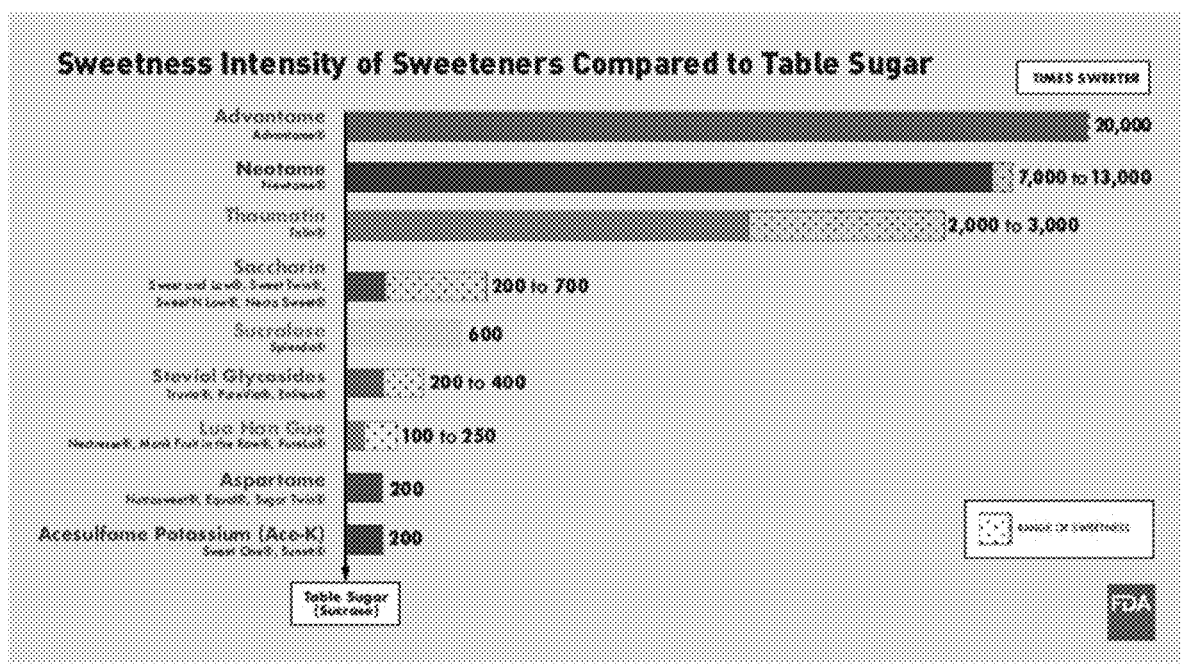

FIG. 2 comprises a graphical chart comparing the sweetness intensity of various high-intensity sweeteners relative to table sugar.

DETAILED DESCRIPTION OF THE INVENTION

Reference will now be made in detail to exemplary aspects of the present invention which are illustrated in the accompanying drawings. Wherever possible, the same reference numbers will be used throughout the drawings to refer to the same or like parts.

This invention relates to a method for hydrating and artificially flavoring seeds from a hard-dry, raw, or roasted form. An alternative embodiment provides a post-process phase whereby the cured pulse or seed may be further processed into a hard, crispy, or crunchy product. pulses or seeds may be produced from the resulting cured pulse or seeds. The curing phase of this invention, as shown in FIG. 1, comprises the following steps:

1) preparing a high-intensity sweetener-based aqueous infusion solution according to a predetermined formulation utilizing a plurality of predetermined ingredients,
2) hydrating a plurality of dry seeds in said high-intensity sweetener-based aqueous infusion solution for an effective period of 12 hours (on average) at 72 F until said hard-dry seeds are flavor infused and hydrated or semi-hydrated,
3) removing said flavor-infused and hydrated or semi-hydrated seeds,
4) drying the external surface of said flavor-infused and hydrated or semi-hydrated seeds.

A plurality of dehydrated pulses or raw or roasted seeds is hydrated in an aqueous infusion solution or by spraying with an aqueous solution that contains a high-intensity artificial sweetener. The aqueous infusion solution will have a predetermined amount of ingredients including, but not limited to, a food safe solvent such as water and a high-intensity sweetener. The ingredients may be any one or more or a combination of the following ingredients: water, food-grade and consumable solvent, food flavorings, food preservatives, flavanols, ingestible minerals, consumable vitamins, nutrients, herbs, salts, spices, monosodium glutamate, fruit extracts and fruit flavorings, vegetable extracts and vegetable flavorings, meat extracts and meat flavorings, nut extracts and nut flavorings, vanilla, cocoa, coffee, tea, liquor, beer, edible acids, artificial sweeteners, high-intensity sweeteners, acidulants, caffeine, polyphenols, catechins, theobromine, amino acids, antioxidants, fatty acids, enzymes, and food colorings.

The aqueous infusion solution preferably contains a minimum concentration, level, or amount of high-intensity sweetener-to-water ratio (preferably in gram units) to achieve the minimum flavor and texture profile for a given amount of soaking or exposure time.

The formula for calculating the correct concentration of high-intensity sweetener (C) for 10 g of pulse (the variable X) or seed in 25 g of solvent such as water (the variable Y)

would be the amount of high-intensity sweetener (the variable I) that reaches an equivalent of sweetness (Ex) necessary to effectively infuse a certain type of pulse or seed.

Specifically, the method for determining the ratio proportion of high-intensity sweetener to solvent amount comprises the following steps:
  identifying the type of high-intensity sweetener to be used,
  identifying the equivalent sweetness of said high-intensity sweetener to table sugar ratio,
  identifying the type of seeds to be hydrated and infused,
  identifying the level of sweetness required to infuse the identified type of seed with flavor,
  identifying the amount of aqueous infusion solution needed to soak a predetermined quantity of seeds,
  determining the high-intensity sweetener to solvent concentration ratio in mass units that will be infusible into the specific type of seed whereby the correct concentration of high-intensity sweetener (C) for a determined quantity of seeds (the variable X) to be dissolved into a predetermined quantity of solvent (the variable Y) would be an amount of high-intensity sweetener (the variable I) necessary to reach an equivalent level of sweetness (Ex) for infusible flavor, the formula being C=Ex/Y,
  determining equivalent sweetness (Ex) based on the degree of sweetness of said high-intensity sweetener (M) relative to a predetermined gram of sugar(s) as follows, Ex=S/M.

The formula for estimating Ex requires knowing how many times sweeter a type of high-intensity sweetener is (M) to a given gram of sugar(S). The formula for determining Ex would be as follows: Ex=S/M. For example, the Ex using sucralose for chickpeas is a multiplier of 600 times sweeter than 90 grams of sugar(S). See, FIG. 3. Thus, Ex=S/M=90 g/600=0.15. The formula for estimating infusion solution concentration (C) is as follows: Ex/Y=C.

For example, where the deduced effective level of sweetness for 10 g of chickpeas (X) soaked in 25 grams of water (Y) is 90 grams of sugar, with the sweetness equivalence of sucralose (Ex) to 90 grams of sugar(S) being a multiplier of 600 times greater (M), the following formula would deduce the proper concentration of infusion solution: C=E/Y=(S/M)/Y= (90/600)/25=0.15/25=0.006 concentration of sucralose to water in grams.

Note that each type of high-intensity sweetener may have a different high-intensity sweetener multiplier because they each vary in their intensity of sweetness. The relative sweetness intensity level between a high-intensity sweetener and sugar (variable M) is currently published through the U.S. Federal Food and Drug Administration (U.S. FDA), as shown in FIG. 2.

Through empirical taste testing using sucralose, which has a sweetness factor approximately 600 times greater than sugar, it was determined that the concentration of the infusion solution for infusing chickpeas was 0.2% to 1.5% of Sucralose, with 0.9% being preferred. When utilizing a different high intensity sweetener, dividing 600 by their sweetness factor and then multiplying that result by the preferred concentration of sucralose (0.9%) will yield the approximate percentage concentration needed.

The conversion formula for determining a quantity and concentration of a first high-intensity sweetener that will achieve an equivalent level of sweetness to that of a predetermined quantity and concentration of a second high-intensity sweetener is as follows: the formula $(M_1/M_2)*Ex_1=Ex_2$, or alternatively the formula $Ex_1*M_1=Ex_2*M_2$, where $M_1$ is the level of sweetness of a first high-intensity sweetener relative to table sugar and $M_2$ is the level of sweetness of a second high-intensity sweetener relative to table sugar and where $Ex_1$ is the equivalent sweetness of the first high-intensity sweetener relative to table sugar and $Ex_2$ is the equivalent sweetness of the second high-intensity sweetener relative to table sugar, where $Ex_1$ or $Ex_2$ may be used interchangeably with the standard variable, Ex for the above referenced formulas.

With regards to the range of effective sweetness for chickpeas, the following are the preferred range of concentration ratios for the aqueous infusion solution. In the case of chickpeas using sucralose, the following formula for an aqueous infusion solution may apply: A minimum concentration ratio of 0.2% high-intensity sweetener solution (i.e. 0.2 g of high-intensity sweeter to 100 g of water). A preferred effective concentration ratio of this invention provides for 0.9% concentration ratio of high-intensity sweetener solution (0.9 g of high-intensity sweetener to 100 g of water). The maximum concentration ratio is preferably 1.5% with 1.5 g to 100 g of water.

The firmness of the chickpeas is mostly determined by the acid concentration of the soaking solution. The concentration of calcium carbonate (hard water) in the solution also plays a role in firmness.

It has been deduced that when infusing 10 g of peanuts with sweetener, the equivalent of approximately 30 g of sugar would need to be present in 15 g of water (or equivalent solvent) for an acceptable sweetness concentration. By applying the same formula as described above for chickpeas but with new variable quantities relevant to peanuts, 0.05 grams of sucralose to 15 grams of water is required, or a 0.3% concentration ratio.

With regards to the range of effective sweetness for peanuts, the following are the preferred range of concentration ratios. In the case of peanuts using sucralose, the following formula for an aqueous infusion solution may apply: A minimum concentration of 0.1% (i.e. 0.1 g of high-intensity sweetener to 100 g of water). The preferred concentration of this invention provides for 0.3% (i.e. 0.3 g high-intensity sweetener to 100 g water). The maximum concentration is preferably 0.6% (i.e. 0.6 g of high-intensity sweetener to 100 g water).

The minimum amount of time for soaking pulse or seeds in the aqueous infusion solution to achieve the minimum flavor and texture profile is 7 hours at 72 degrees Fahrenheit temperature. With regards to a maximum amount of time for soaking said pulse or seeds in the infusion solution before they begin to fall apart or lose texture, the time limit is beyond 48 hours. According to existing experimentations, little to no degradation was observed for seeds or pulse that were soaked within the aqueous infusion solution for 48 hours. The above-described measurements and soaking times apply to any type of high-intensity sweetener described herein.

Infused peanuts will have absorbed approximately 30% of their final weight and chickpeas will have absorbed approximately 50% of their final weight after being immersed in a pool of infusion solution containing a high-intensity artificial sweetener and or other miscellaneous flavorings.

When infusing 10 grams of chickpeas with the proper amount of sweetness, approximately 25 grams of infusion solution is required. From the 25 grams of infusion solution, 5 grams is absorbed by the chickpeas. In this case, the preferred concentration ratio of the infusion solution using sucralose is 0.2 grams of sucralose into 25 grams of water, or a 0.8% concentration ratio.

When infusing 10 grams of peanuts with the proper amount of sweetness, approximately 15 grams of infusion solution is required. From the 15 grams of solution, 5 grams is absorbed by the peanuts. In this case, the preferred concentration ratio of the infusion solution using sucralose is 0.05 grams of sucralose into 15 grams of water, or a 0.03% concentration ratio.

Through empirical taste testing using sucralose, which has a sweetness factor approximately 600 times greater than sugar, it was determined that the concentration of the infusion solution for infusing chickpeas was 0.2% to 1.5% of Sucralose, with 0.9% being preferred. When utilizing a different high intensity sweetener, dividing 600 by their sweetness factor and then multiplying that result by the preferred concentration of sucralose (0.9%) will yield the approximate percentage concentration needed.

Through empirical taste testing using sucralose, which has a sweetness factor approximately 600 times greater than sugar, it was determined that the concentration of the infusion solution for infusing peanuts was 0.1% to 0.6% of Sucralose, with 0.3% being preferred. When utilizing a different high intensity sweetener, dividing 600 by their sweetness factor and then multiplying that result by the preferred concentration of sucralose (0.9%) will yield the approximate percentage concentration needed.

According to an embodiment of the invention herein, the preferred process produces palatably flavored hard, crispy or crunchy seeds that include the initial step of hydrating by submersion a plurality of raw or roasted seeds in an infusion liquid as described above. Using a predetermined amount of ingredients according to the formulation described herein, the seeds are submersed for 12 hours. According one embodiment, 1000 grams of roasted peanuts are hydrated within an infusion liquid with the following concentration ratio: 1500 grams of water, 4.4 grams of sucralose, and 13 grams of raspberry water-soluble flavoring. The peanuts may then be roasted in an oven at 300° F. for approximately 32 minutes or until the desired crunchy texture is obtained. The aforementioned ingredient volumes are not absolute and can be adjusted up or down to affect the flavor profile of the peanut. For more visual appeal, food coloring may be added to the infusion solution.

The infusion or hydration process may occur at room temperature for a period of 1 to 36 hours depending on the temperature of the infusion solution. Twelve hours of soaking may be sufficient at room temperature. Higher soaking temperature or pressure requires less time.

According to another embodiment of the invention herein, the preferred process produces palatably flavored hard, crispy or crunchy seeds that include the initial step of hydrating by submersion a plurality of raw or roasted seeds in an infusion liquid as described above. Using a predetermined amount of ingredients according to the formulation described herein, the seeds are submersed for 12 hours. According to this embodiment, 1000 grams of chickpeas is submersed in infusion solution with the following concentration ratio: 2500 grams of water, 6.7 grams of sodium benzoate, 6.7 grams potassium sorbate 40.0 grams of malic acid, 20 grams of sucralose, 50.0 grams of mango water soluble flavoring, 80.0 grams of salt. The aforementioned ingredient volumes are not absolute and can be adjusted up or down to affect the flavor profile and firmness of the chickpea. For more visual appeal, food coloring may be added to the infusion solution.

In this embodiment, the post-infusion pulse or seed will have the following result:

The level of absorbed sodium benzoate is near 0.1%

The level of absorbed potassium sorbate is near 0.1%

The chickpeas will have an equilibrium pH adjusted to less than 4.6 after 24 hours.

Upon reaching this level of hydration, the chickpeas may be boiled in water for at least 10 minutes. This assures that the toxin lectin is destroyed. Additional salt may be added to the boiling water at this stage to increase the level of salty flavor. The amount of salt added may preferably be 1% to 6% with 3% being a preferred concentration of salt in the boiling water by weight.

The infusion process may be done at room temperature for a period of 1 to 36 hours depending on the temperature of the infusion solution. Twelve hours soaking time is usually sufficient, at room temperature. Higher temperatures or pressures require less time. The chickpeas hydration is usually completed when the chickpea infused pulses contain 40% to 60% by weight of the aqueous infusion solution.

While the foregoing specification illustrates and describes exemplary embodiments, it will be understood by those skilled in the art that various changes may be made and equivalents may be substituted for elements, thereof, without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

These and additional object, advantages, features and benefits of the present invention will become apparent from the following specification.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

The invention claimed is:

1. A method of masking and replacing the natural flavor of the flesh of an edible seed or pulse by manner of submersing said edible seed or pulse in an effective high-intensity sweetener-based aqueous infusion solution as follows:

preparing an effective high-intensity sweetener-based aqueous infusion solution according to a predetermined formulation utilizing a plurality of predetermined ingredients, said predetermined ingredients comprising an unflavored ingestible solvent, an effective amount of high-intensity sweetener, and a flavor additive, the concentration of said effective high-intensity sweetener is a high-intensity sweetener to solvent ratio that can achieve an equivalent level of sweetness of a super-saturated sugar solution but with a density low enough for a seed or pulse to sink and submerge therein, submersing a plurality of seeds or pulse in said effective high-intensity sweetener-based aqueous infusion solution until the flesh of said seeds or pulse is not orally perceptible by taste, submersing a plurality of seeds or pulse in said effective high-intensity sweetener-based aqueous infusion solution until the flesh of said seed or pulse is infused with the flavor of said effective high-intensity sweetener-based aqueous infusion solution and said flavor additive, removing said flavor-masked and infused seeds or pulse from said effective high-intensity sweetener-based aqueous infusion solution, drying said masked and infused seeds.

2. The method of claim 1, wherein preparing the effective high-intensity sweetener-based aqueous infusion solution of claim 1 that can effectively mask the natural flavor of the flesh of a seed or pulse and replace the natural flavor of the flesh of said seed or pulse with an artificial flavor, comprises the following steps:

mixing and dissolving a predetermined amount of high-intensity sweetener with a predetermined amount of said unflavored ingestible solvent according to a predetermined formulation to produce an effective high-intensity sweetener-based aqueous solution having an effective concentration of high-intensity sweetener, the predetermined formulation for the effective concentration of high-intensity sweetener (C) is based on mass units of high-intensity sweetener (I) to solvent (Y) ratio sufficient to submerge a predetermined quantity of seed or pulse (X), said ratio (I:Y) comprising a predetermined amount of high-intensity sweetener that can reach an effective level of sweetness (Ex) to mask and infuse the flesh of said seed or pulse (C=Ex/Y), the effective amount of high-intensity sweetener (Ex) is an amount of a quantity of high-intensity sweetener that is equivalent to an amount of sugar necessary to produce a super-saturated sugar solution, mixing and dissolving a predetermined amount of flavor additive into said effective high-intensity sweetener-based aqueous solution.

3. The method of claim 1, wherein said effective high-intensity sweetener-based aqueous infusion solution of claim 1 comprises a predetermined proportion of high-intensity sweetener-to-solvent ratio of between 0.1% to 1.5% utilizing sucralose dissolved in 100 g of water.

4. The method of claim 1, wherein said effective high-intensity sweetener-based aqueous infusion solution comprises a predetermined proportion of a non-sucralose high-intensity sweetener-to-solvent ratio that is equivalent to the high-intensity sweetener to-solvent ratio between 0.1% to 1.5% utilizing sucralose dissolved in 100 g of water.

* * * * *